Nov. 23, 1954  R. E. WHITE  2,694,929
FIRE CONTROL COMPENSATING DEVICE
Filed Nov. 14, 1949
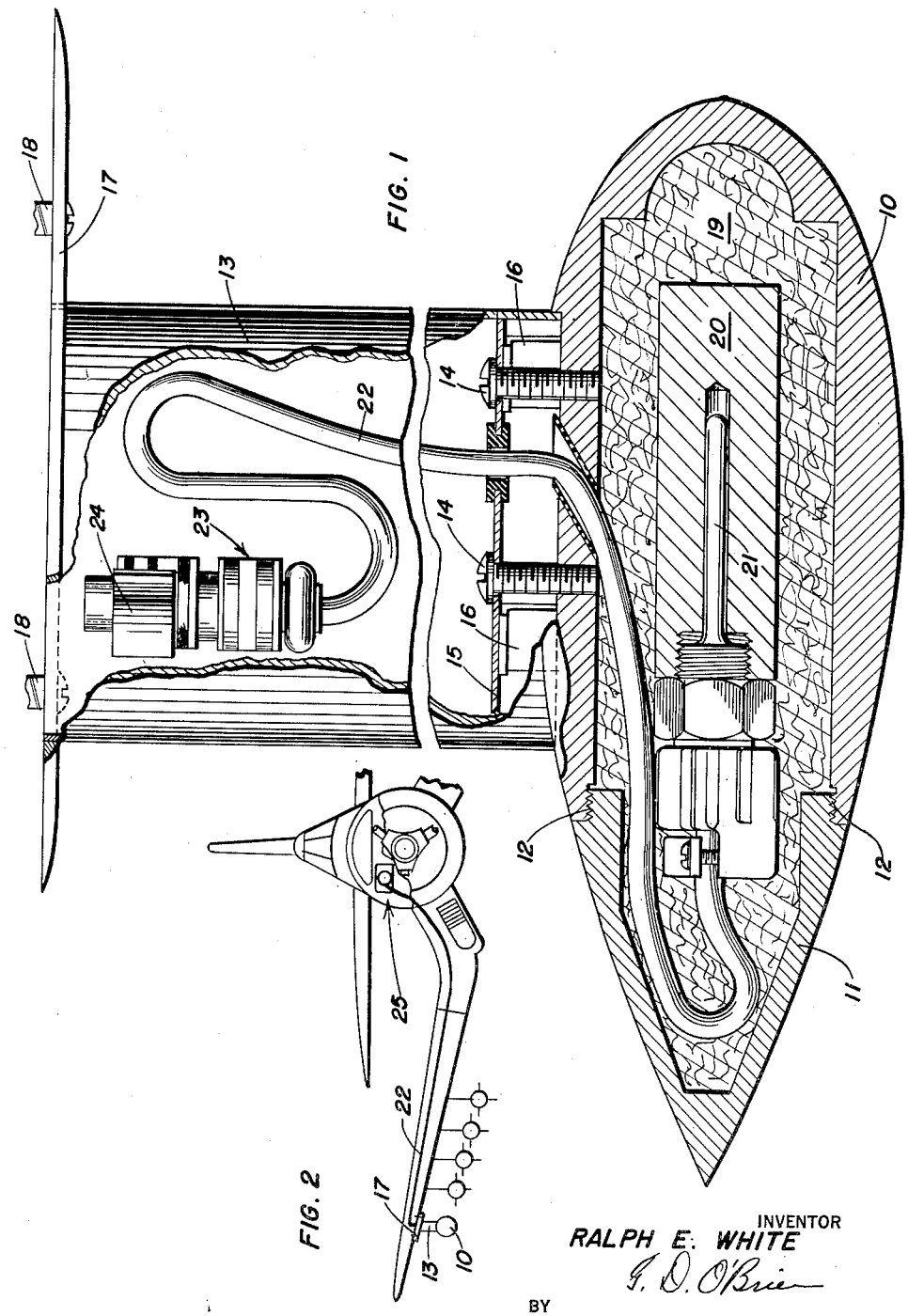
INVENTOR
*RALPH E. WHITE*
BY
ATTORNEY

United States Patent Office 2,694,929
Patented Nov. 23, 1954

2,694,929

FIRE CONTROL COMPENSATING DEVICE

Ralph E. White, Altadena, Calif., assignor, by mesne assignments, to the United States of America as represented by the Secretary of the Navy Application November 14, 1949, Serial No. 126,940

1 Claim. (Cl. 73—343)

This invention relates to devices for indicating the internal temperatures of objects and more particularly to a temperature indicator which may be used to determine the effective temperature of the propellant within a rocket to be fired from an aircraft.

Frequently, it is important to obtain a knowledge of the internal temperature of a body yet there is no effective way of actually measuring such internal temperature without inserting temperature sensitive means into the body. In many cases this cannot be done without destroying the utility of the body and particularly is this true when a knowledge of the internal temperature of ammunition is required.

For example, in order to compute accurately the ballistics of a rocket it is important to know the temperature of the rocket propellant in order that such information may be fed into a computer and the setting of the rocket sights compensated for the change in burning rate due to such change in temperature. Heretofore, it has been the practice to estimate the effective temperature of the rocket propellant by referring to a chart which converts the ambient temperature into estimated propellant temperature, the operator feeding this information into the computer by hand. This is clumsy, inaccurate, and time consuming and even though a knowledge within 15° F. is sufficient to give an accuracy in the sight within 2 mils, it has been indicated that this close an estimation by reference to the chart is not always possible under tactical conditions.

The rate of temperature change within any object, such as a rocket, depends upon its dimensions, the nature of its surface, its thermal capacity and the thermal conductivity of its structural parts. Therefore when an object is subjected to rapidly fluctuating ambient temperature conditions, as is often the case when an aircraft bearing a rocket changes altitude, it is apparent that the internal temperature change of the object will lag considerably behind the change in environment temperature, thus making the latter an unreliable guide for estimating the former.

Consequently, it is an object of the present invention to provide a means for indicating the internal temperature of an object without actually inserting temperature sensitive elements into the object.

Another object of the invention is to provide a temperature indicating device adapted to be installed on an aircraft and which will give an indication of the effective temperature of the propellant within rockets that are to be fired from the aircraft.

Yet another object of the invention is to provide a rocket propellant temperature measuring device which may be connected to a computer mechanism to automatically compensate for changes in the temperature of the rocket propellant.

Still another object is to provide a temperature indicating device of the above type which is light, compact and portable, and which, when installed on the wing of an aircraft, offers little resistance to its operation.

Other objects and attendant advantages of this invention will become apparent when the following detailed description is read in conjunction with the accompanying drawings wherein:

Fig. 1 is a longitudinal sectional view partly in elevation of one embodiment of the present invention; and Fig. 2 is a front elevation of a wing portion of an aircraft showing the manner in which the present invention may be installed in proximity to a group of rockets.

In the embodiment illustrated it will be noted that the indicator comprises a streamlined body 10 which may be constructed of any suitable material such as aluminum, and a tail portion 11 which may be secured to the body by any suitable means such as threads 12 shown, thus permitting access to the interior of the device.

At the top of the body 10 is provided a streamlined tubular support 13 to which the body 10 may be secured in any convenient manner as by screws 14 extending through a plate 15 positioned inside the lower end of the tubular support 13. This plate rests upon the upper ends of a plurality of brackets 16 spot welded or otherwise secured to the inner surface of tube 13. The upper end of the tubular support may be provided with a plate 17 welded or otherwise secured in place and apertured to expose the inside of the tube. The entire device may be detachably secured to the undersurface of an airplane wing by suitable fasteners such as the Dzus fasteners 18 indicated.

The interior of the body 10 may be lined with insulating material 19, which, in the embodiment illustrated, comprises hard felt although any suitable insulation may be employed which has the required thermal characteristics to provide the device with a rate of heat transfer comparable to the rate of heat transfer for the particular type of rocket with which the device is to be used. Mounted within the body and supported by the insulating material is a hollow metal core 20 acting as a thermal capacitor and in which is embedded a temperature sensitive bulb 21 secured in place by any suitable means.

The temperature sensitive bulb 21 is connected by a suitable cable 22 to a plug 23 which when not in use may be supported in a clip 24 as shown. There is sufficient slack in the cable 22 so that the plug 23 may be lifted out of the support tube 13, before the bracket plate 17 is attached to the plane, and be plugged into a receptacle (not shown) in the wing.

The temperature sensitive bulb 21 may comprise any one of a number of temperature responsive bulbs such as a unit having a resistance which varies with temperature change in which case it may be connected in an electrical circuit embodying a Wheatstone bridge in the manner well known in the art. The temperature may be visually indicated or may automatically impart a temperature change coefficient into a rocket sight computer indicated generally at 25 in Fig. 2. Suitable means may of course be employed to amplify the temperature signal before feeding it into the computer.

As illustrated in Fig. 2, the indicator is mounted on the plane adjacent the rocket but clear of the propeller wash so that the ambient temperature conditions that surround it will be the same as the conditions which surround the rockets. It will be apparent that the streamline contour of the shell 10 and the tube 13 causes the indicator to offer little resistance to the operation of the aircraft.

Prior to loading, the indicator may be stored with the rockets and thus maintained at the same temperature so that when they are loaded in the launchers and the indicator has been fastened to the plane it will accurately give an indication of the effective temperature of the rocket propellant at all times.

It is to be understood that though the device specified above is designed for rockets to be fired from aircraft it is not necessarily limited to such but may, with the proper selection of insulating material having a suitable rate of heat transmission, be used for indicating the internal temperature of other objects where such information is required. Hence, the specification is merely illustrative of the principles of the invention and variations may be made therein falling within the scope of the invention as defined by the appended claim.

What is claimed is:

Equipment for use with a moving aircraft adapted to transport a plurality of releasable propellant containing missiles in predetermined directionally similar relationship outboard of the aircraft, said missiles being counterparts of one another and said aircraft being provided with a missile fire control computer requiring adjustment for changes in temperature of the propellant within said missiles; said equipment comprising a housing having an aerodynamic shape substantially identical with that of said missiles, a core portion in said housing formed of a thermally conductive metal having a thermal capacity commensurate with that of the internal contents of one of said missiles, and thermal insulation maintaining said core portion spaced internally of said housing, said insulation being chosen for its ability to set the thermal conductivity between said housing and core equal to that of one of said missiles between its outer casing and the propellant contained therein, a bracket adapted to be fixed to the aircraft for supporting said housing and the contents thereof outboard of the aircraft in close proximity and in directionally similar relationship to said missiles whereby said housing is exposed to the same ambient temperature and aerodynamic conditions as said missiles, a temperature sensitive transducer element embedded in said core so as to be shielded from the airstream produced by aircraft movement, whereby said element responds solely to temperature changes occurring throughout said core, acting as a thermal capacitor, and means for transmitting the responses of said temperature sensitive element inboard of the aircraft whereby the effective temperature of the missile propellant may be set into said computer.

References Cited in the file of this patent

UNITED STATES PATENTS

| Number | Name | Date |
|---|---|---|
| 1,421,517 | Malcamp | July 4, 1922 |
| 1,828,628 | Torgerson | Oct. 20, 1931 |
| 2,040,285 | Tietz et al. | May 12, 1936 |
| 2,254,155 | Reichel | Aug. 26, 1941 |
| 2,303,704 | Oseland | Dec. 1, 1942 |
| 2,428,581 | Peterson | Oct. 7, 1947 |
| 2,433,238 | Ramirez | Dec. 23, 1947 |
| 2,612,747 | Skinner | Oct. 7, 1952 |
| 2,612,780 | De Bruyne | Oct. 7, 1952 |

OTHER REFERENCES

Rocket Propulsion Elements, by Sutton, Call TL782S9, pub. by John Wiley and Sons Inc., pp. 280–281.

Exterior Ballistics, by Alger, paragraphs 275, 302 and 303; 1915.

Popular Science Magazine, p. 101, January 1940.